(12) United States Patent
Chavan et al.

(10) Patent No.: US 10,052,524 B1
(45) Date of Patent: Aug. 21, 2018

(54) PROCESS FOR INCORPORATING GRAPHENE INTO A CORE OF A GOLF BALL

(71) Applicant: Callaway Golf Company, Carlsbad, CA (US)

(72) Inventors: Vijay Chavan, Vista, CA (US); David Bartels, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 15/782,666

(22) Filed: Oct. 12, 2017

Related U.S. Application Data

(63) Continuation-in-part of application No. 15/705,011, filed on Sep. 14, 2017, which is a continuation-in-part of application No. 15/436,169, filed on Feb. 17, 2017, now Pat. No. 9,789,366.

(60) Provisional application No. 62/401,034, filed on Sep. 28, 2016.

(51) Int. Cl.
| | |
|---|---|
| *A63B 37/06* | (2006.01) |
| *A63B 37/00* | (2006.01) |
| *A63B 45/00* | (2006.01) |
| *C08K 3/04* | (2006.01) |
| *C08L 9/00* | (2006.01) |

(52) U.S. Cl.
CPC ...... *A63B 37/0051* (2013.01); *A63B 37/0031* (2013.01); *A63B 37/0043* (2013.01); *A63B 37/0045* (2013.01); *A63B 37/0062* (2013.01); *A63B 37/0064* (2013.01); *A63B 37/0074* (2013.01); *A63B 37/0075* (2013.01); *A63B 37/0076* (2013.01); *A63B 37/0092* (2013.01); *A63B 45/00* (2013.01); *C08K 3/041* (2017.05); *C08K 3/042* (2017.05); *C08L 9/00* (2013.01)

(58) Field of Classification Search
CPC ... A63B 45/00; A63B 37/005; A63B 37/0076; A63B 37/0051
USPC .................................................. 473/409, 351
See application file for complete search history.

(56) References Cited

U.S. PATENT DOCUMENTS

| | | | |
|---|---|---|---|
| 1,191,383 | A | 7/1916 | Aylsworth |
| 3,492,197 | A | 1/1970 | Olstowski et al. |
| 4,844,471 | A | 7/1989 | Terence et al. |
| 4,911,451 | A | 3/1990 | Sullivan et al. |
| 4,986,545 | A | 1/1991 | Sullivan |
| 5,048,838 | A | 9/1991 | Chikaraishi et al. |
| 5,252,652 | A | 10/1993 | Egashira et al. |
| 5,588,924 | A | 12/1996 | Sullivan et al. |
| 5,688,595 | A | 11/1997 | Yamagishi et al. |
| 5,721,304 | A | 2/1998 | Pasqua |
| 5,725,442 | A | 3/1998 | Higuchi et al. |
| 5,779,562 | A | 7/1998 | Melvin et al. |
| 5,816,937 | A | 10/1998 | Shimosaka et al. |
| 5,830,086 | A | 11/1998 | Hayashi et al. |
| 5,980,396 | A | 11/1999 | Moriyama et al. |

(Continued)

*Primary Examiner* — Raeann Gorden
(74) *Attorney, Agent, or Firm* — Michael A. Catania; Sonia Lari; Rebecca Hanovice

(57) ABSTRACT

A method for forming a golf ball with a graphene core disclosed herein. The method includes mixing a graphene masterbatch material with a polybutadiene material to form a core mixture, wherein the graphene masterbatch material comprises graphene in an amount from 0.1 to 80.0 weight percent of the graphene masterbatch material mixed with a carrier polymer in an amount from 99.9 to 20 weight percent of the graphene masterbatch material.

9 Claims, 14 Drawing Sheets

(56) References Cited

U.S. PATENT DOCUMENTS

| | | |
|---|---|---|
| 6,117,026 A | 9/2000 | Hayashi et al. |
| 6,123,630 A | 9/2000 | Hayashi et al. |
| 6,142,886 A | 11/2000 | Sullivan et al. |
| 6,248,027 B1 | 6/2001 | Hayashi et al. |
| 6,251,031 B1 | 6/2001 | Hayashi et al. |
| 6,277,034 B1 | 8/2001 | Nesbitt et al. |
| 6,299,550 B1 | 10/2001 | Molitor et al. |
| 6,361,454 B1 | 3/2002 | Yoshida et al. |
| 6,443,858 B2 | 9/2002 | Bartels et al. |
| 6,461,251 B1 | 10/2002 | Yamagishi et al. |
| 6,461,253 B2 | 10/2002 | Ogg |
| 6,468,169 B1 | 10/2002 | Hayashi et al. |
| 6,478,697 B2 | 11/2002 | Yagley et al. |
| 6,482,345 B1 | 11/2002 | Dewanjee |
| 6,495,633 B1 | 12/2002 | Sullivan et al. |
| 6,520,870 B2 | 2/2003 | Tzivanis et al. |
| 6,565,455 B2 | 5/2003 | Hayashi et al. |
| 6,565,456 B2 | 5/2003 | Hayashi et al. |
| 6,626,770 B2 | 9/2003 | Takemura et al. |
| 6,653,382 B1 | 11/2003 | Statz et al. |
| 6,685,579 B2 | 2/2004 | Sullivan |
| 6,705,956 B1 | 3/2004 | Moriyama et al. |
| 6,743,122 B2 | 6/2004 | Hayashi et al. |
| 6,849,006 B2 | 2/2005 | Cavallaro et al. |
| 6,994,638 B2 | 2/2006 | Rajagopalan et al. |
| 7,121,959 B1 | 10/2006 | Yoshida et al. |
| 7,220,191 B2 | 5/2007 | Onoda et al. |
| 7,226,367 B2 | 6/2007 | Higuchi et al. |
| 7,303,490 B2 | 12/2007 | Takesue et al. |
| 7,335,114 B2 | 2/2008 | Hebert et al. |
| 7,361,102 B2 | 4/2008 | Ladd et al. |
| 7,537,531 B2 | 5/2009 | Ladd et al. |
| 7,591,741 B2 | 9/2009 | Sullivan et al. |
| 7,874,939 B2 | 1/2011 | Sullivan et al. |
| 7,918,748 B2 | 4/2011 | Ogg et al. |
| 8,025,593 B2 | 9/2011 | Rajagopalan et al. |
| 8,109,843 B2 | 2/2012 | Hebert et al. |
| 8,425,351 B2 | 4/2013 | Ogg et al. |
| 8,475,298 B2 | 7/2013 | Ogg et al. |
| 8,651,976 B1 | 2/2014 | Ogg et al. |
| 8,876,635 B1 | 11/2014 | Ogg |
| 9,370,694 B2 | 6/2016 | Luciano, Jr. et al. |
| 9,393,462 B2 | 7/2016 | Farrell |
| 2002/0065149 A1 | 5/2002 | Tzivanis et al. |
| 2002/0165045 A1 | 11/2002 | Ogg et al. |
| 2005/0020385 A1 | 1/2005 | Onoda et al. |
| 2005/0037866 A1 | 2/2005 | Emerson et al. |
| 2005/0250601 A1 | 11/2005 | Kim et al. |
| 2005/0272867 A1 | 12/2005 | Hogge et al. |
| 2006/0264269 A1 | 11/2006 | Rajagopalan et al. |
| 2006/0270790 A1 | 11/2006 | Comeau |
| 2008/0058121 A1 | 3/2008 | Comeau |
| 2013/0165261 A1 | 6/2013 | Luciano, Jr. et al. |
| 2015/0133593 A1 | 5/2015 | Kissell et al. |
| 2015/0343270 A1 | 12/2015 | DuFaux |
| 2015/0375051 A1 | 12/2015 | Shiga et al. |
| 2015/0375062 A1 | 12/2015 | Farrell |
| 2016/0279482 A1* | 9/2016 | DuFaux ............ A63B 37/0051 |

\* cited by examiner

PROCESS FOR INCORPORATING GRAPHENE INTO A CORE OF A GOLF BALL

CROSS REFERENCES TO RELATED APPLICATIONS

The Present Application U.S. patent application Ser. No. 15/705,011, filed on Sep. 14, 2017, which is a continuation-in-part application of U.S. patent application Ser. No. 15/436,169, filed on Feb. 17, 2017, which claims priority to U.S. Provisional Patent Application No. 62/401,034, filed on Sep. 28, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the use of graphene and carbon nanotubes in layers of a golf ball.

Description of the Related Art

Graphene is a two dimensional form of carbon that has some very unusual mechanical, thermal, and electrical properties. For example, it is more than 100 times stronger than steel, thermally more conductive than silver, and electrically more conductive than copper. Benefits of graphene can be utilized in composites to obtain materials with excellent mechanical, thermal, and electrical properties. To achieve this improvement, however, uniform dispersion of graphene in composite matrix such as polymer is extremely important. Graphene in powdered form tends to form aggregates and may in fact hurt final properties of composites if not dispersed properly. Various examples can be found in literature that emphasize the need for uniform dispersion. For example, Tang et al. demonstrated higher mechanical strength and electrical conductivity for epoxy composites with well dispersed graphene compared to composites that had poorly dispersed graphene. Teng et al. used functional polymers to disperse graphene that resulted in more than 20% improvement in thermal conductivity of epoxy composite compared to poorly dispersed graphene. Wan et al. describe use of surfactant to improve graphene dispersion in an epoxy based nanocomposite which shows better tensile strength compared to non-surfactant based graphene-epoxy nanocomposite. Xu et al. used simple vacuum filtration technique to achieve uniform dispersion of graphene in polyvinyl alcohol based composites. They attribute increased mechanical strength to the uniform dispersion of graphene that improves graphene polymer interaction. Song et al. talk about improving graphene dispersion by coating it with polypropylene based latex. Coated graphene is then incorporated in a polypropylene matrix to obtain polypropylene composite with higher tensile strength and Young's modulus. Naebe et al. describe a chemical functionalization method of graphene that improves its dispersion in an epoxy matrix to such an extent that with just 0.1% wt functionalized graphene results in more than 20% increase in flexural strength. U.S. Pat. No. 8,287,699 B2 describes chemically functionalizing graphene with groups such as bromide and then using this functional group to carry out in-situ polymerization of styrene to obtain a polystyrene/graphene nanocomposite. U.S. Pat. No. 8,652,362 B2 talks about functionalizing graphene with epoxy groups for better incorporation in an epoxy polymer matrix. A composite material made from this graphene based epoxy and curing agent showed better electrical conductivity than composite that contained un-modified graphene. U.S. Pat. No. 7,745,528 B2 describe using functionalized graphene in solvent such as tetrahydrofuran for better dispersion in a polydimethylsiloxane based composite. U.S. Pat. No. 7,914,844 B2 describe using oxidized graphene solution to dissolve a polymer. This polymer graphene solution is then chemically reduced and dried to obtain a composite with better electrical conductivity. They attribute increased electrical conductivity to the reduced nature of graphene that has lesser oxygen content than oxidized graphene.

Most of the methods mentioned in the literature use chemical functionalization methods, ultrasonication or solvents for dispersing graphene in a polymer matrix. There is need to design a better process where a good dispersion of graphene is achieved without the need to use any oxidizing/reducing agents or solvents.

BRIEF SUMMARY OF THE INVENTION

The primary purpose of the present invention is to enhance the durability of golf ball rubber core by using nanofillers such as graphene in a well dispersed form. Good dispersion of graphene in core is achieved by using it in a masterbatch form and not in a powder form. Carrier polymers used in masterbatch, include but are not limited to, polybutadiene, polyisoprene, polyisobutylene, EPDM, polyethylene ionomer, maleic anhydride functionalized polyethylene, styrene butadiene rubber, styrene isoprene rubber, and butyl rubber.

Another objective is to improve aging properties due to the incorporation of graphene in the core for better retention of compression and COR over time.

The graphene gets mixed twice, once during masterbatch process and second when it is added to a rubber core mixture.

Incorporation is dust free, graphene stays in masterbatch.

Various golf ball properties such as compression and COR can be changed by changing the carrier polymer present in the masterbatch.

One aspect of the present invention is a method for forming a core for a golf ball. The method includes mixing a graphene masterbatch material with a polybutadiene material to form a core mixture, wherein the graphene masterbatch material comprises graphene in an amount from 0.1 to 80.0 weight percent of the graphene masterbatch material mixed with a carrier polymer in an amount from 99.9 to 20 weight percent of the graphene masterbatch material. The method also includes compression molding a core from the core mixture.

A more preferred embodiment of the method includes forming a cover over the core.

A more preferred embodiment of the method includes forming a mantle layer over the core.

A more preferred embodiment of the method includes that the core mixture is molded over an inner core to produce a dual core with a diameter ranging from 0.7 inch to 1.6 inches.

A more preferred embodiment of the method includes compression molding a core from the core mixture comprises compression molding an outer core layer over a center core comprising a polybutadiene mixture.

A more preferred embodiment of the method includes compression molding a core from the core mixture comprises compression molding a center core and an outer core over the center core, and the center core and the outer core comprise the core mixture.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
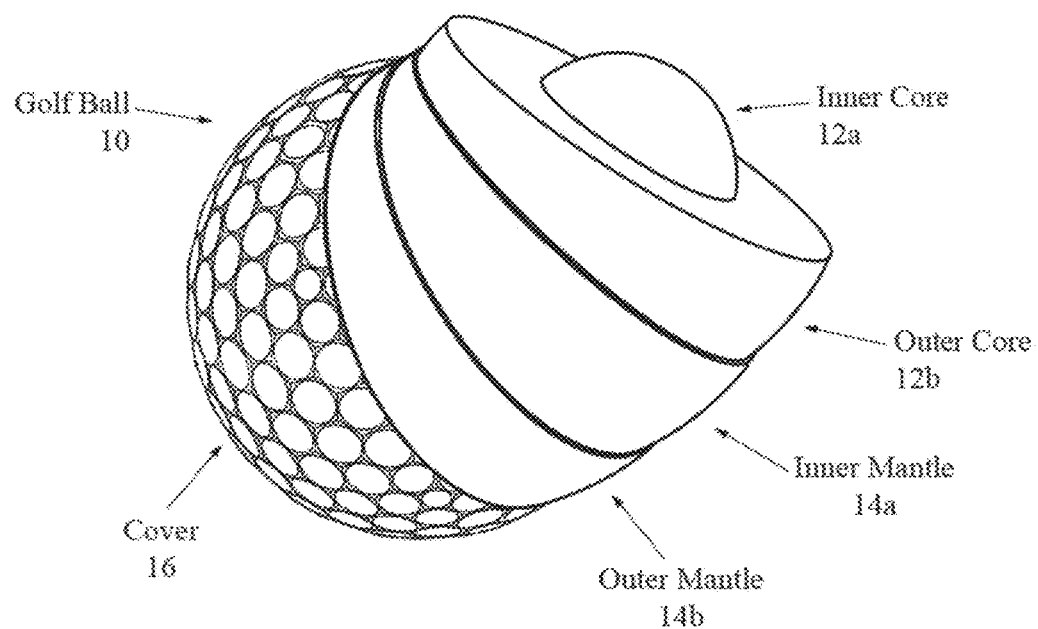
FIG. 1 is an exploded partial cut-away view of a golf ball.
Figure 2:
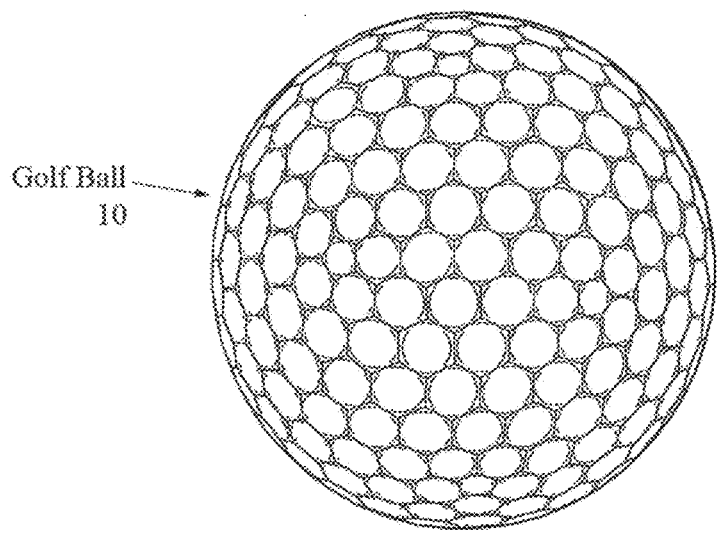
FIG. 2 is top perspective view of a golf ball.
Figure 3:
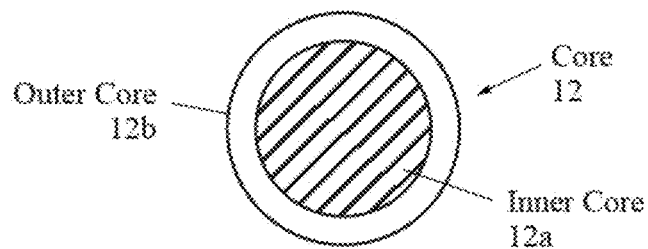
FIG. 3 is a cross-sectional view of a core component of a golf ball.
Figure 4:
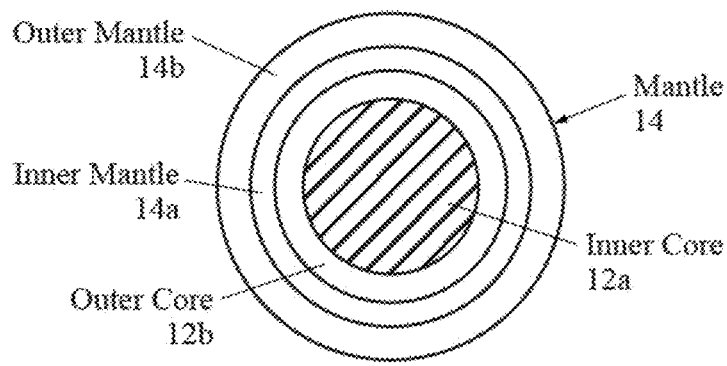
FIG. 4 is a cross-sectional view of a core component and a mantle component of a golf ball.

In a typical rubber mixer such as Banburry or Kneader, 7.5 lbs of graphene was blended with 30 lbs of polybutadiene rubber. Mixing was done at temperatures between room temperature to 400 F for times between 1 min to 40 min. More mixing was later done on a two roll mill. Mixing temperature mentioned in the processes above can have a wide range such as −130 F to the thermal degradation temperature of carrier polymer. Although mixing time is mentioned in minutes, it can be done for anytime from few seconds to minutes or few hours. Although economically not viable, mixing can also be done for few days.

The Masterbatch is made of 1-80% by weight of graphene or and carbon nanotube and 20-99% by weight of a polymer.

Carrier polymers used in masterbatch include, but are not limited to, polybutadiene, polyisoprene, polyisobutylene, EPDM, polyethylene ionomer, maleic anhydride functionalized polyethylene, styrene butadiene rubber, styrene isoprene rubber, and butyl rubber.

Masterbatch can be made by mixing polymer and graphene or and carbon nanotube in an internal mixer and then optionally additional mixing can be done on a two roll mill.

The masterbatch can be added to a typical golf core recipe at 1-60% by weight.

The dispersion of nanofillers such as graphene or and carbon nanotubes in a rubber core can be improved by using masterbatch of these fillers. Nanofillers by themselves have a tendency to form aggregates. Using masterbatch helps disperse polymer between layers/tubes of nanofillers which facilitates their further incorporation in a rubber core.

Better dispersion is obtained since these nanofillers get mixed twice (once during masterbatch process and second during golf ball core mixing process).

This process prevents dust formation since nanofiller is added in a masterbatch form and not in a powder.

This process is environmentally friendly since it does not use any strong solvent, any strong oxidizing or reducing agents for modifying or dispersing graphene No post or pre-treatment of graphene is needed for its dispersion in a polymer matrix No ultra-sonication of graphene is required.

Polybutadiene based cores were made using following materials. Corresponding levels (by % wt) is mentioned next to each material: Polybutadiene with more than 60% 1,4-cis structure-(40-90%); Polyisoprene-(1-30%); Zinc diacrylate-(10-50%); Zinc oxide-(1-30%); Zinc stearate-(1-20%); Peroxide initiator-(0.1-10%); Zinc pentachlorothiophenol-(0-10%); Color-(0-10%); Barium sulfate-(0-20%); Graphene-(0.01-6%)-available from various suppliers such as Cheap Tubes Inc., Ad-Nano Technologies Private Limited, MKnano, XG Sciences Inc., Angstron Materials Inc. which has a surface area between 150-1000 $m^2/g$; Graphene masterbatch (a masterbatch with 5-95% polybutadiene or polyisoprene and 1-10% graphene)-(0.1-50%)-custom compounding can be done with the help of various suppliers such as Preferred Compounding Corp, Dyna-Mix, Alttran, Callaway (in house compounding; CNT-(0.01-6%)-available from various suppliers such as Bayer Material Science, Future Carbon, Cheap Tubes Inc, NanoAmor, Nanocyl, Nanocyl SA, Arkema, NanoTechLabs, Inc.; CNT masterbatch (a masterbatch of with 5-95% polyisoprene and 1-95% CNT)-(01-50%)-masterbatches or custom masterbatches are available from various suppliers such as Cheap Tubes Inc, Nanocyl SA, Arkema, NanoTechLabs, Inc.

Dual Cores with Graphene/CNT in the Outer Core.

In this study graphene, CNT, and a mixture of graphene and CNT were introduced to the outer core in a dual core construction. Dual cores were made by compression molding two outer core halves around an already molded inner core having a diameter of approximately 0.940" and a soft compression of approximately 0.210 inches of deflection under a 200 lb load. Curing of the inner and outer core was done at temperatures ranging between 150-400 F for times ranging from 1-30 minutes. After molding, the dual cores were spherically ground to approximately 1.560" prior to testing.

Table 1 and 2 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE 1

Inner core recipe

| | % wt |
|---|---|
| Components | |
| Polybutadiene rubber | 70.1 |
| Polyisoprene rubber | 0.0 |
| Zinc diacrylate | 15.9 |
| Zinc oxide | 7.0 |
| Zinc stearate | 0.0 |
| Peroxide initiator | 1.1 |
| Zinc pentachlorothiophenol | 0.6 |
| Color | 0.1 |
| Barium sulfate | 0.0 |
| graphene | 0.0 |
| graphene masterbatch | 0.0 |
| CNT | 0.0 |
| CNT Masterbatch | 0.0 |
| Properties | |
| Compression | 0.210 |

TABLE 3

Outer core recipe of dual core

| | Formula 1 (0% Graphene) % wt | Formula 2 (0.8% Graphene) % wt | Formula 3 (0.8% CNT) % wt | Formula 4 (0.8% Graphene + CNT mixture) % wt |
|---|---|---|---|---|
| Components | | | | |
| Polybutadiene | 63.3 | 62.5 | 62.5 | 62.5 |
| Zinc Diacrylate | 26.3 | 26.9 | 26.9 | 26.9 |
| Zinc Oxide | 6.3 | 5.9 | 5.9 | 5.9 |
| Zinc Stearate | 0.0 | 0.0 | 0.0 | 0.0 |
| Peroxide initiator | 0.5 | 0.5 | 0.5 | 0.5 |
| Zinc pentachlorothiophenol | 0.6 | 0.6 | 0.6 | 0.6 |
| Color | 0.1 | 0.1 | 0.1 | 0.1 |
| Limestone | 0.0 | 0.0 | 0.0 | 0.0 |
| Tungsten | 0.0 | 0.0 | 0.0 | 0.0 |
| Barium sulfate | 2.9 | 2.8 | 2.8 | 2.8 |
| Graphene | 0.0 | 0.0 | 0.0 | 0.0 |
| Graphene in masterbatch | 0.0 | 0.8 | 0.0 | 0.4 |
| CNT | 0.0 | 0.0 | 0.0 | 0.0 |
| CNT added in masterbatch form | 0.0 | 0.0 | 0.8 | 0.4 |
| Properties of outer core | | | | |
| Compression | 100.7 | 101.2 | 102.3 | 102.2 |
| COR (coefficient of restitution) | 0.816 | 0.809 | 0.806 | 0.808 |

TABLE 3-continued

Outer core recipe of dual core

| | Formula 1 (0% Graphene) % wt | Formula 2 (0.8% Graphene) % wt | Formula 3 (0.8% CNT) % wt | Formula 4 (0.8% Graphene + CNT mixture) % wt |
|---|---|---|---|---|
| Properties of dual core built from inner and outer core | | | | |
| Compression | 81.3 | 82.7 | 86.3 | 85.1 |
| COR (coefficient of restitution @ 125 fps) | 0.812 | 0.808 | 0.808 | 0.809 |
| Durability score or mean time to fail MTTF (number of shots after which ball starts to crack/fail) | 21 | 62 | 73 | 65 |

Compression is measured by applying a 200 pound load to the core and measuring its deflection, in inches. Compression=180−(deflection*1000)

Durability Testing of Dual Cores

Cores were shot at 175 fps in a pneumatic testing machine (PTM).

For each formula mentioned in Table 2, 12 cores were tested. Number of shots after which each core cracked was recorded for each core, and the cracked core was removed from the remainder of the test. The data was reported using a Weibull plot, and the mean time to fail was reported as shown in Table 2. As seen in FIG. 1, graphene/CNT modified cores endured more shots before failure compared to cores with no graphene/CNT. It is reasonable to assume that the durability of a golf ball having a dual core of this design will also experience a dramatic increase in crack durability based on this improvement to the dual core. It is reasonable to assume that the addition of graphene/CNT in the inner core could provide a durability enhancement to the overall golf ball, but this study only focused on the outer core.

As our experiment has shown, incorporating graphene and CNT into the outer core recipe reinforces the strength of the outer core and provides greater crack durability protection in the design of a dual core golf ball, which is more susceptible to crack durability failures if the outer core is much firmer than the soft inner core.

FIGS. 1, 3, 4 and 5 illustrate a five piece golf ball 10 comprising an inner core 12a, an outer core 12b, an inner mantle 14a, an outer mantle 14b, and a cover 16, wherein the cover layer 16 is composed of a thermoplastic polyurethane and has a Shore A hardness less than 90. The inner core 12a comprises polybutadiene mixture comprising 0.4 to 2.5 weight percent of a graphene.

Figure 5:
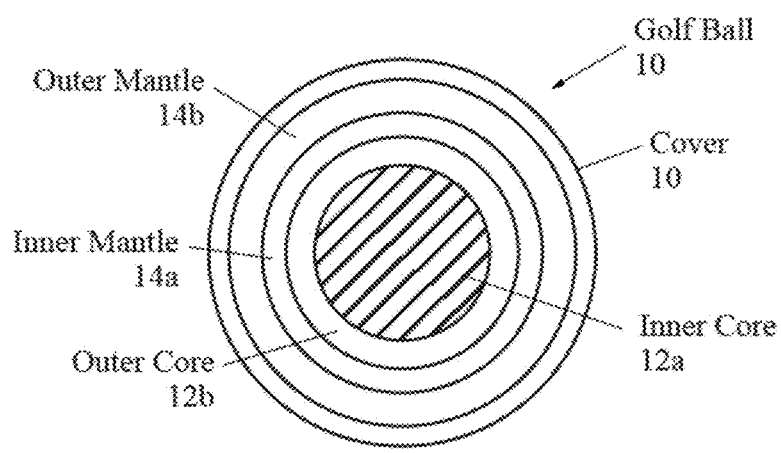
FIG. 5 is a cross-sectional view of an inner core layer, an outer core layer, an inner mantle layer, an outer mantle layer and a cover layer of a golf ball.
Figure 5A:
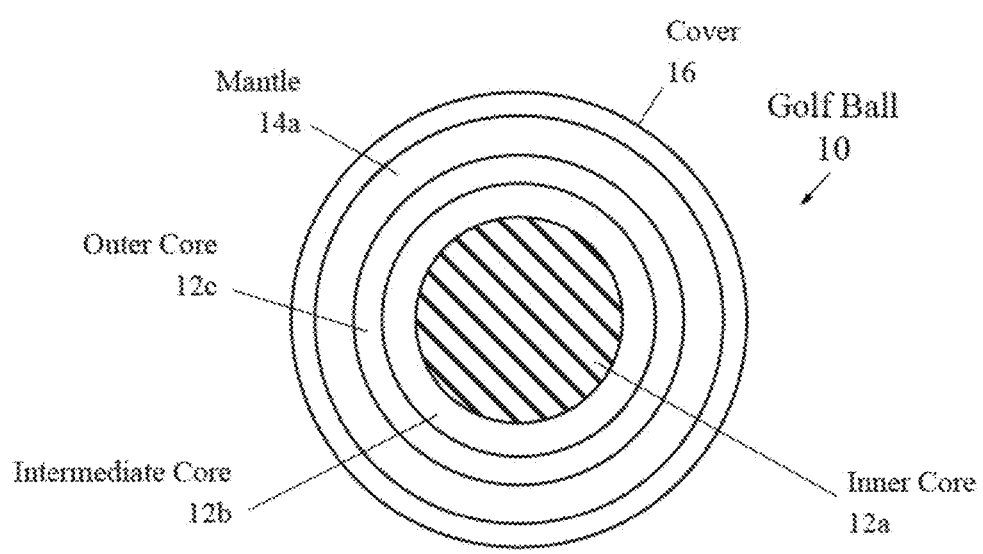
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein the cover layer 16 is composed of a thermoplastic polyurethane. The intermediate core 12b comprises polybutadiene mixture comprising 0.4 to 2.5 weight percent of a graphene.

Figure 8:
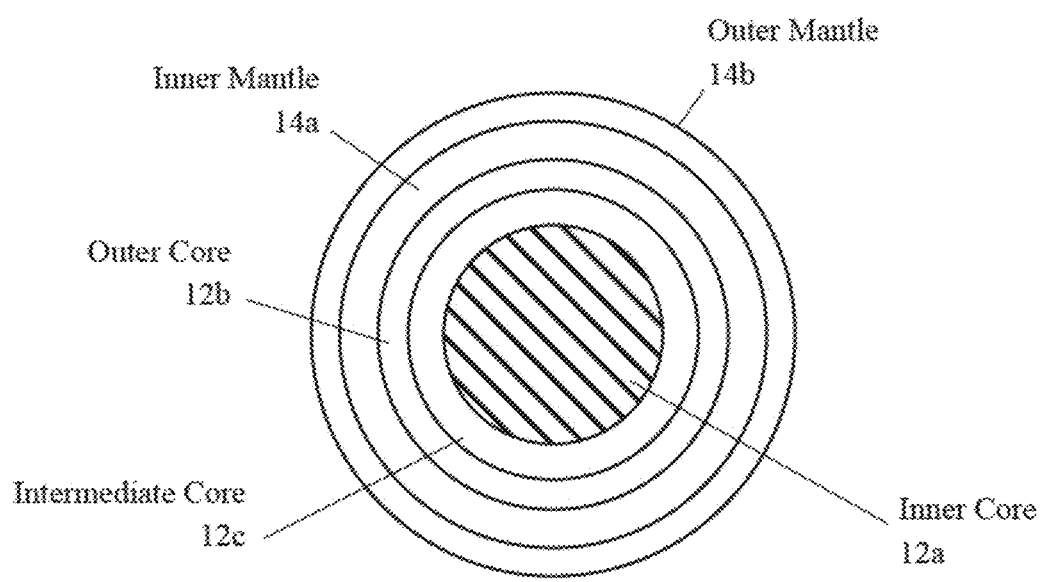
FIG. 8 is a cross-sectional view of a core component and a mantle component of a golf ball.
Figure 9:
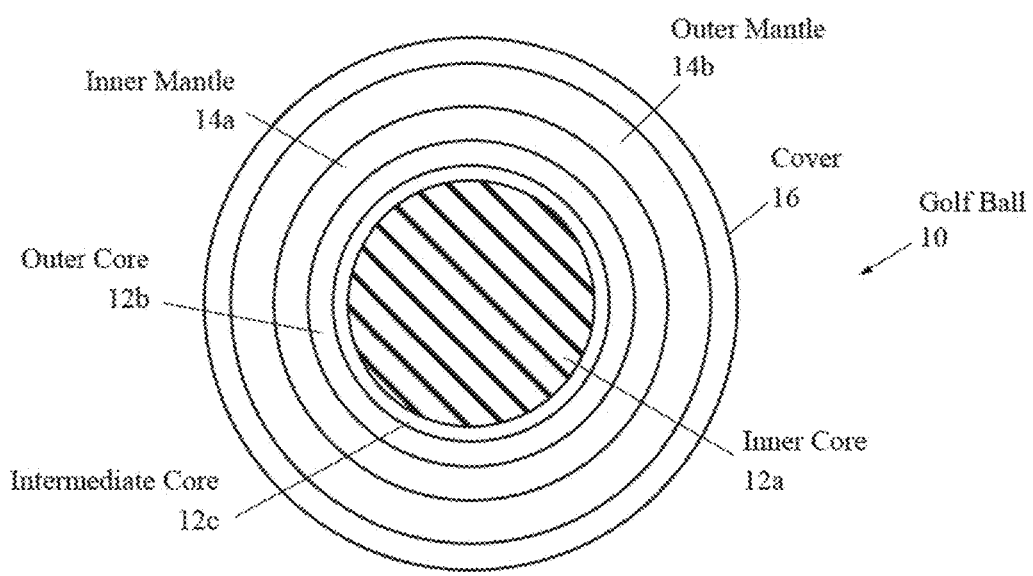
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein the cover layer 16 is composed of a thermoplastic polyurethane. The inner core 12a comprises polybutadiene mixture comprising 0.4 to 2.5 weight percent of a graphene.

Figure 10:
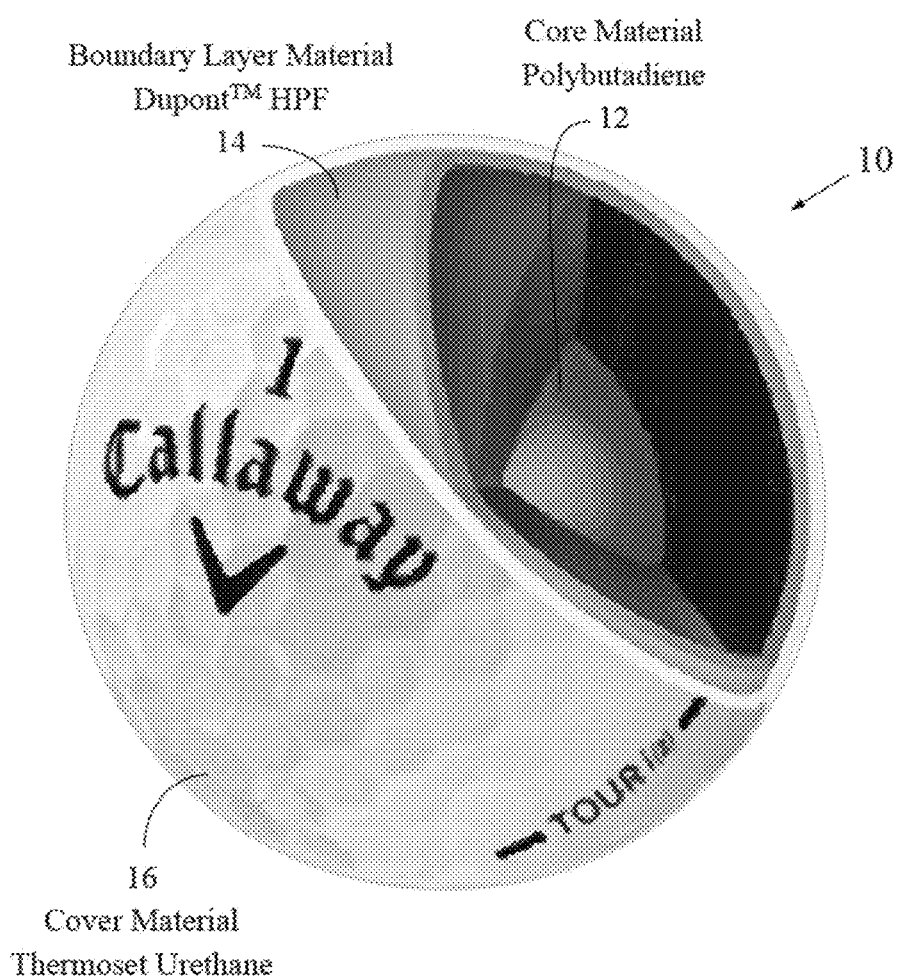
FIG. 10 is an exploded partial cut-away view of a four-piece golf ball.

FIG. 10 illustrates a four piece golf ball comprising a dual core, a boundary layer and a cover. The outer core comprises polybutadiene mixture comprising 0.4 to 2.5 weight percent of a graphene.

Figure 11:
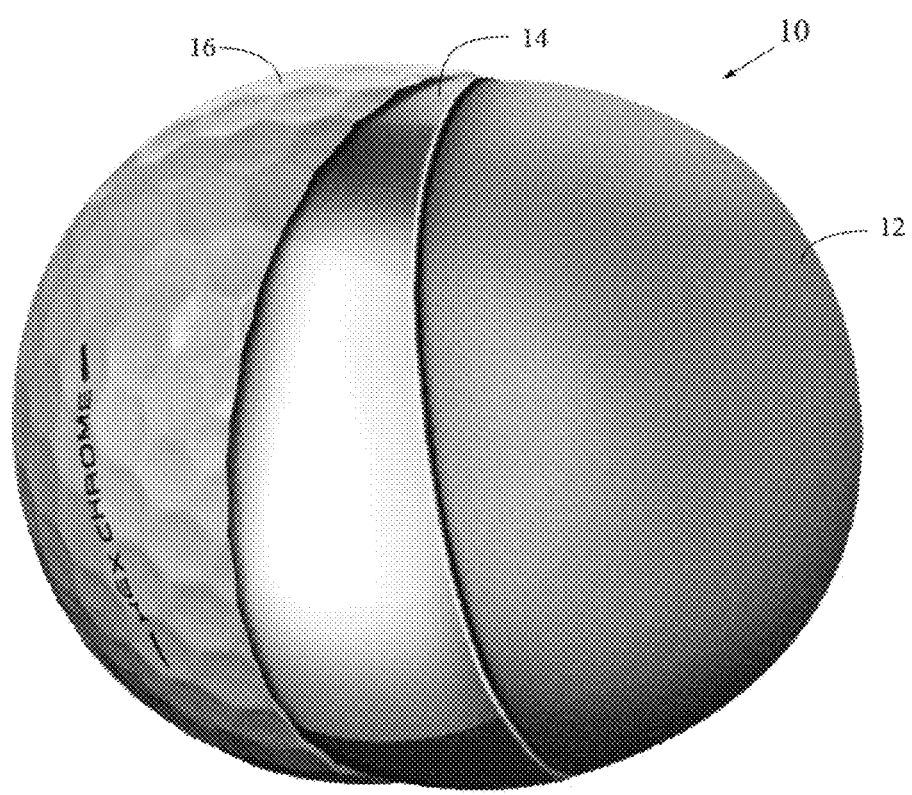
FIG. 11 is an exploded partial cut-away view of a three-piece golf ball.

FIG. 11 illustrates a three piece golf ball comprising a core, a boundary layer and a cover. The core comprises polybutadiene mixture comprising 0.4 to 2.5 weight percent of a graphene.

Figure 12:
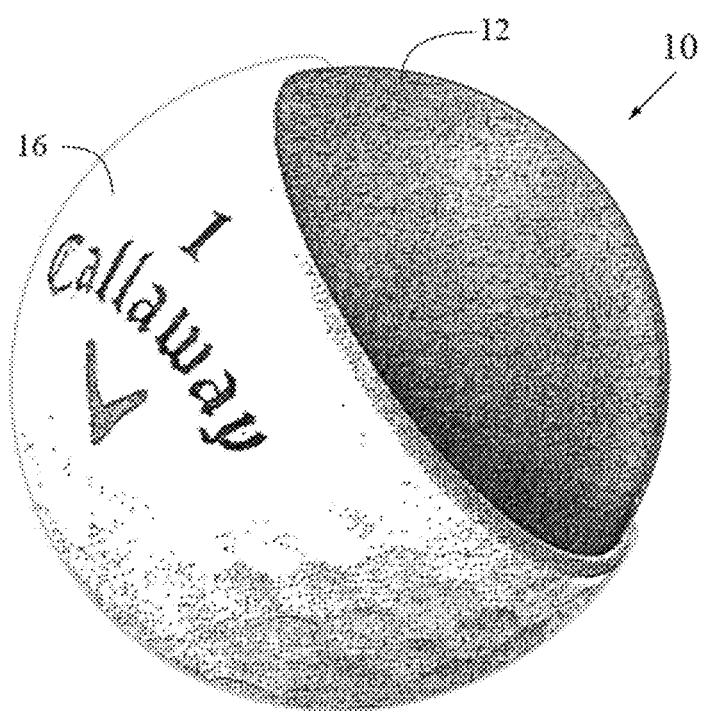
FIG. 12 is an exploded partial cut-away view of a two-piece golf ball.
Figure 13:
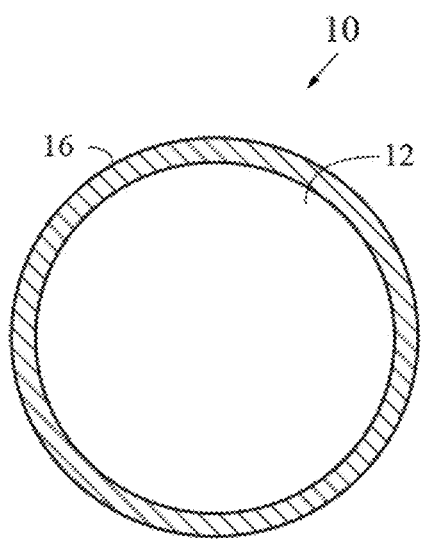
FIG. 13 is a cross-sectional view of a two-piece golf ball.

FIGS. 12 and 13 illustrate a two piece golf ball 20 with a core 25 and a cover 30. The core comprises polybutadiene mixture comprising 0.4 to 2.5 weight percent of a graphene.

Figure 14:
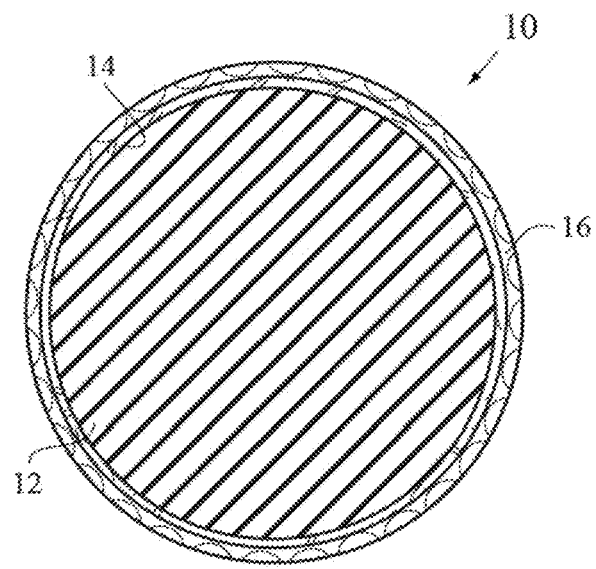
FIG. 14 is a cross-sectional view of a three-piece golf ball.
Figure 15:
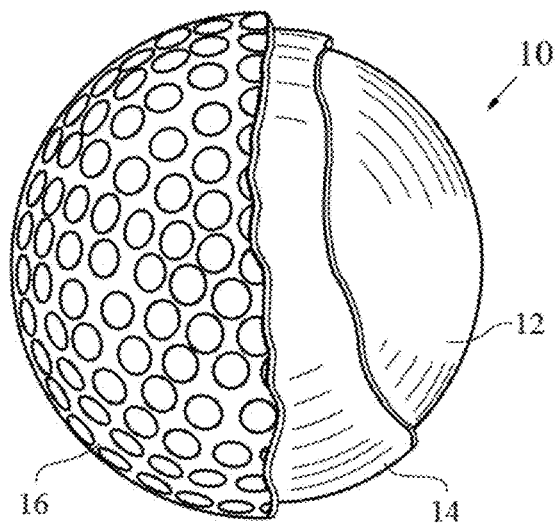
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18, wherein the core comprises 0.4 to 2.5 weight percent of a graphene.

Figure 16:
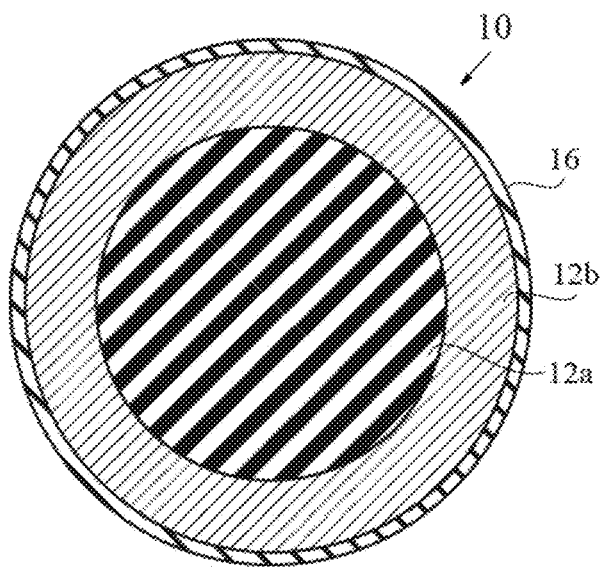
FIG. 16 is a cross-sectional view of a three-piece golf ball with a dual core and a cover.

FIG. 16 illustrates a dual core three piece golf ball 35 comprising an inner core 30, and outer core 32 and a cover 34, wherein the core comprises 0.4 to 2.5 weight percent of a graphene.

Figure 17:
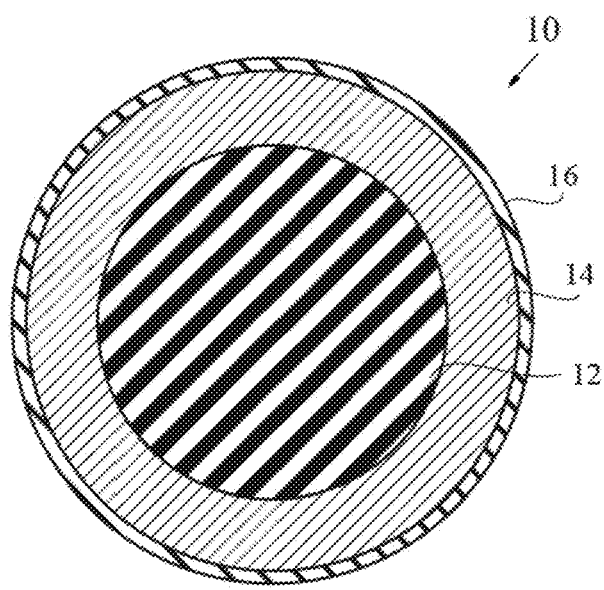
FIG. 17 is a cross-sectional view of a three-piece golf ball with a core, mantle and cover.

FIG. 17 illustrates a three piece golf ball 45 comprising a core 40, a mantle layer 42 and a cover 44, wherein the core comprises 0.4 to 2.5 weight percent of a graphene.

Figure 18:
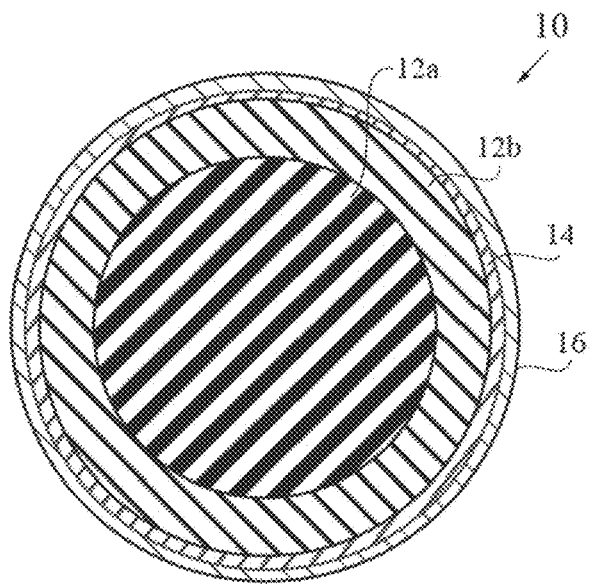
FIG. 18 is a cross-sectional view of a four-piece golf ball with a dual core, mantle layer and a cover.

FIG. 18 illustrates a dual core four piece golf ball 55 comprising an inner core 50, an outer core 52, a mantle layer 54 and a cover 56, wherein the core comprises 0.4 to 2.5 weight percent of a graphene.

Figure 19:
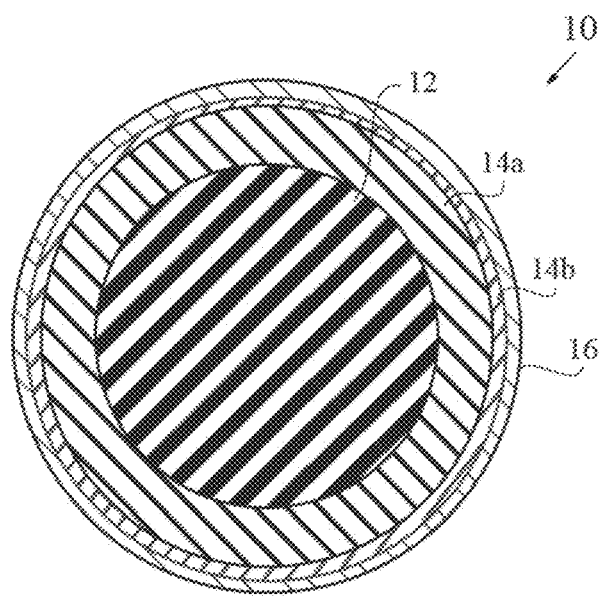
FIG. 19 is a cross-sectional view of a four-piece golf ball with a core, dual mantle layers and a cover.
Figure 20:
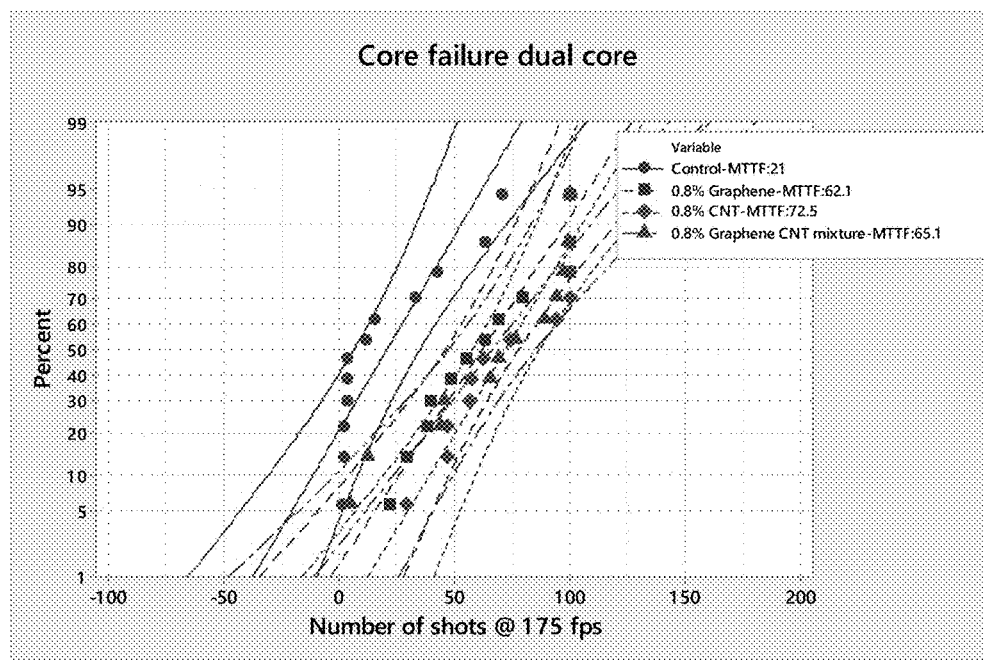
FIG. 20 is a graph of durability testing of outer cores using PTM at 175 fps.

FIG. 19 illustrates a four piece golf ball 65 comprising a core 60, an inner mantle 62, an outer mantle 64 and a cover 66, wherein the core comprises 0.4 to 2.5 weight percent of a graphene.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
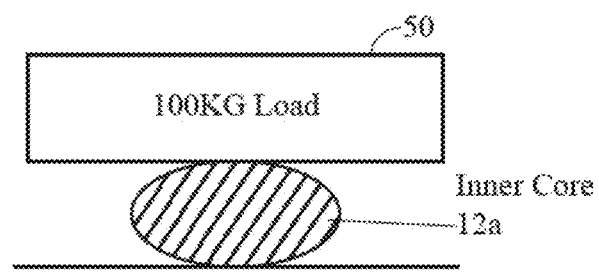
FIG. 6 is a cross-sectional view of an inner core layer under a 100 kilogram load.
Figure 7:
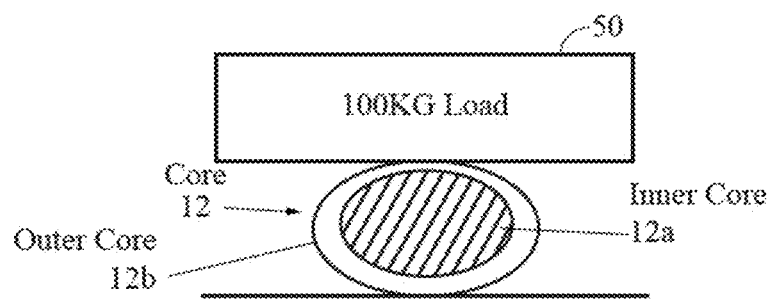
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for forming a golf ball with a graphene core, the method comprising:

mixing a graphene masterbatch material with a polybutadiene material to form a core mixture, the core mixture comprising a polybutadiene in an amount ranging from 40 to 90 weight percent, zinc diacrylate in an amount ranging from 10 to 50 weight percent, zinc oxide in an amount ranging from 1 to 30 weight percent, peroxide initiator in an amount ranging from 0.1 to 10 weight percent, and 0.4 to 2.5 weight percent graphene material, wherein the graphene masterbatch material comprises graphene in an amount from 0.1 to 80.0 weight percent of the graphene masterbatch material mixed with a carrier polymer in an amount from 99.9 to 20 weight percent of the graphene masterbatch material, wherein the graphene material has a surface area ranging from 150 $m^2/g$ to 1000 $m^2/g$; and compression molding a core from the core mixture.

2. The method according to claim 1 wherein the core has a diameter ranging from 0.70 inch to 1.6 inch.

3. The method according to claim 1 further comprising forming a cover over the core.

4. The method according to claim 1 further comprising forming a mantle layer over the core.

5. The method according to claim 4 wherein the carrier polymer material is selected from the group consisting of polybutadiene, polyisoprene, polyisobutylene, EPDM, polyethylene ionomer, maleic anhydride functionalized polyethylene, styrene butadiene rubber, styrene isoprene rubber, and butyl rubber.

6. The method according to claim 1 wherein compression molding a core from the core mixture comprises compression molding a center core.

7. The method according to claim 1 wherein compression molding a core from the core mixture comprises compression molding an outer core layer over a center core comprising a polybutadiene mixture.

8. The method according to claim 1 wherein compression molding a core from the core mixture comprises compression molding a center core and an outer core over the center core, and the center core and the outer core comprise the core mixture.

9. A method for forming a golf ball with a graphene core, the method comprising:

mixing a graphene masterbatch material with a polybutadiene material to form a core mixture, the core mixture comprising a polybutadiene in an amount ranging from 40 to 90 weight percent, zinc diacrylate in an amount ranging from 10 to 50 weight percent, zinc oxide in an amount ranging from 1 to 30 weight percent, peroxide initiator in an amount ranging from 0.1 to 10 weight percent, and 0.4 to 2.5 weight percent graphene material, wherein the graphene masterbatch material comprises graphene in an amount from 0.1 to 1.0 weight percent of the graphene masterbatch material mixed with a carrier polymer in an amount from 99.9 to 99 weight percent of the graphene masterbatch material, wherein the graphene material has a surface area ranging from 150 $m^2/g$ to 1000 $m^2/g$; and
compression molding a core from the core mixture.

* * * * *